(12) United States Patent
Väänänen

(10) Patent No.: US 11,029,091 B2
(45) Date of Patent: Jun. 8, 2021

(54) ARC FURNACE BOTTOM CONSTRUCTION

(71) Applicant: Outokumpu Oyj, Helsinki (FI)

(72) Inventor: Eero Väänänen, Tornio (FI)

(73) Assignee: Outokumpu Oyj, Helsinki (FI)

( * ) Notice: Subject to any disclaimer, the term of this patent is extended or adjusted under 35 U.S.C. 154(b) by 210 days.

(21) Appl. No.: 16/307,235

(22) PCT Filed: Jun. 7, 2017

(86) PCT No.: PCT/FI2017/050422
§ 371 (c)(1),
(2) Date: Dec. 5, 2018

(87) PCT Pub. No.: WO2017/212116
PCT Pub. Date: Dec. 14, 2017

(65) Prior Publication Data
US 2019/0301802 A1    Oct. 3, 2019

(30) Foreign Application Priority Data
Jun. 7, 2016   (FI) ..................... 20165473

(51) Int. Cl.
| F27D 1/00 | (2006.01) |
| F27D 9/00 | (2006.01) |
| C21C 5/52 | (2006.01) |
| F27B 3/08 | (2006.01) |
| F27B 3/24 | (2006.01) |
| F27D 1/12 | (2006.01) |
| F27B 3/12 | (2006.01) |

(52) U.S. Cl.
CPC .............. *F27D 9/00* (2013.01); *C21C 5/5211* (2013.01); *F27B 3/08* (2013.01); *F27B 3/085* (2013.01); *F27B 3/24* (2013.01); *F27D 1/00* (2013.01); *F27D 1/12* (2013.01); *F27B 2003/125* (2013.01); *F27D 2009/0013* (2013.01); *F27D 2009/0018* (2013.01); *Y02P 10/20* (2015.11)

(58) Field of Classification Search
CPC ..... F27D 1/00; F27D 1/12; F27D 9/00; F27D 2009/0013; F27D 2009/0018; F27B 3/08; F27B 3/085; F27B 3/10; F27B 3/12; F27B 3/14; F27B 3/24; F27B 2003/125; C21C 5/52; C21C 5/5211; C21C 5/5229; Y02P 10/20; Y02P 10/216; H05B 7/02; H05B 7/06; H05B 7/11; H05B 7/18; H05B 7/20
USPC ................................. 373/60, 71–76
See application file for complete search history.

(56) References Cited

U.S. PATENT DOCUMENTS

| 3,717,713 | A | * | 2/1973 | Schlienger | ............... H05B 7/02 373/72 |
| 3,723,632 | A |   | 3/1973 | Beizerov | |
| 4,197,900 | A |   | 4/1980 | Bloshenko et al. | |
| 4,870,655 | A |   | 9/1989 | Ward | |
| 5,197,080 | A | * | 3/1993 | Johnson | ............... F27D 1/12 373/74 |

(Continued)

*Primary Examiner* — Hung D Nguyen
(74) *Attorney, Agent, or Firm* — The Webb Law Firm

(57) ABSTRACT

An arc furnace bottom construction for maintaining the outer surface temperature of the bottom construction essentially at least on the lower part of the arc furnace essentially close to the temperature surrounding the arc furnace. The bottom construction contains at least two constructions to be cooled and being positioned to each other in different heights seen from the side view.

13 Claims, 1 Drawing Sheet

(56) References Cited

U.S. PATENT DOCUMENTS 5,653,936 A * 8/1997 Enkner .................... F27B 3/24
 266/193
6,693,949 B1 2/2004 Schubert et al.

* cited by examiner

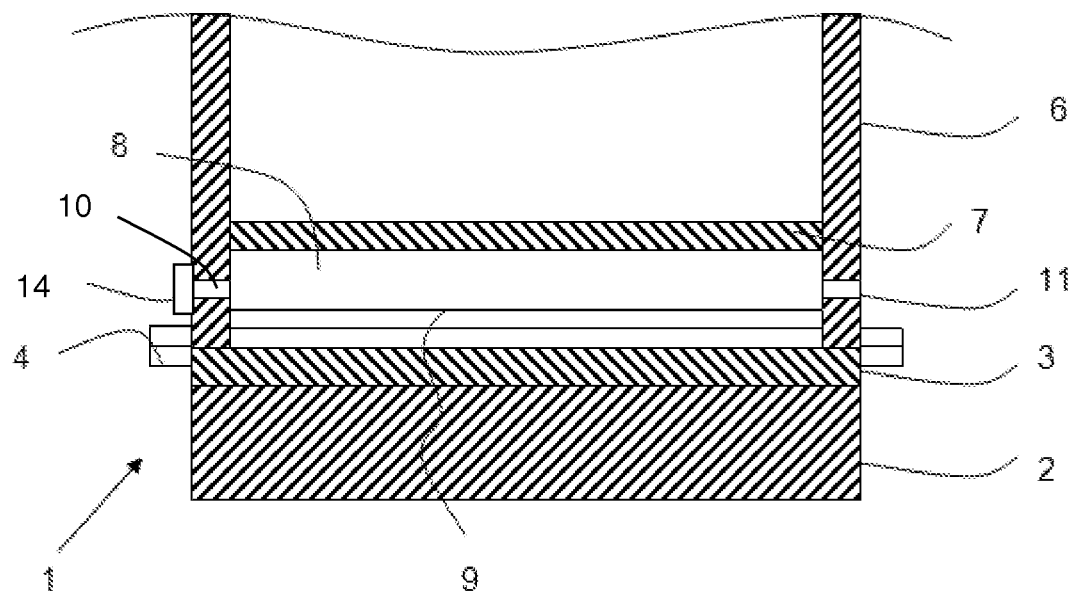
FIG. 1
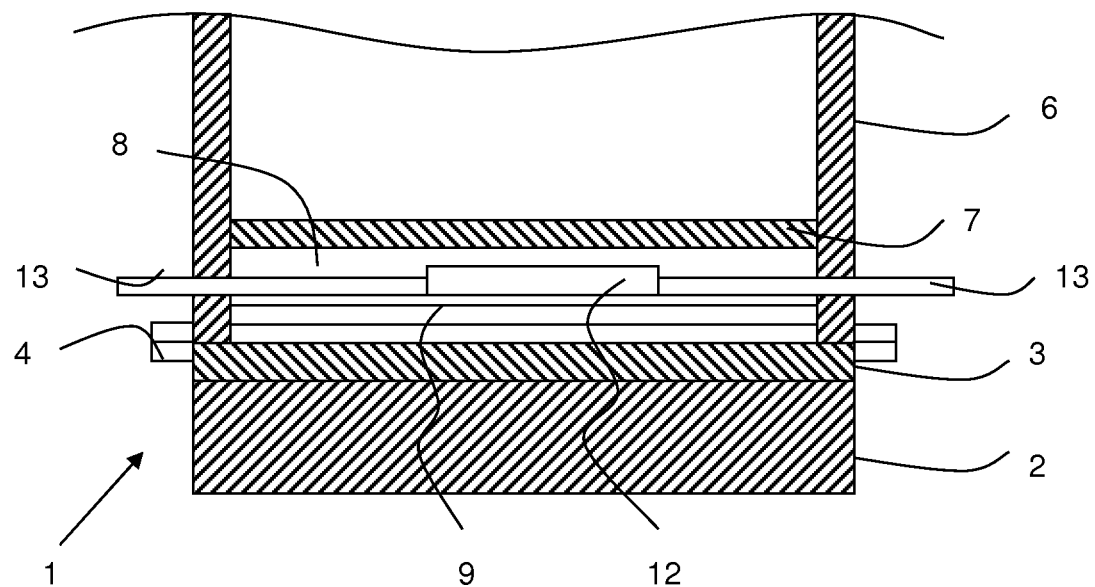
FIG: 2

ARC FURNACE BOTTOM CONSTRUCTION

CROSS-REFERENCE TO RELATED APPLICATIONS

This application is the United States national phase of International Application No. PCT/FI2017/050422 filed Jun. 7, 2017, and claims priority to Finnish Patent Application No. 20165473 filed Jun. 7, 2016, the disclosures of which are hereby incorporated in their entirety by reference.

BACKGROUND OF THE INVENTION

Field of the Invention

The present invention relates to an arc furnace bottom construction, which achieves the maintenance of the outer surface temperature at least on the lower part of the arc furnace essentially close to the temperature surrounding the arc furnace.

Description of the Related Art

When using an arc furnace for smelting metal components, such as ferrochrome or stainless steel, the inner temperature of the arc furnace is about 1500-1700 ° C. Then the jacket of the arc furnace and especially the bottom of the arc furnace are subjected for big heat loads. Especially the bottom of the arc furnace shall be lined so that the melt metal does not in any circumstances reach to damage the bottom of the arc furnace so that the melt metal is uncontrollably managed to flow out of the furnace, and so it is reduced the risk of work safety. The bottom of the arc furnace is required to have a special lining. On other hand based on the work safety it is also important, that the arc furnace itself and especially the surface temperature of the bottom of the arc furnace are managed to adjust as close as possible to the temperature surrounding the arc furnace. The cooling of the vertical walls of the arc furnace is usually carried out by conducting towards the wall vertically at least one section a water flow, which flows along the vertical wall downwards. Using the water flow the surface temperature of the vertical walls of the arc furnace is managed to adjust in the desired value. The bottom of the arc furnace is not managed to cool with a respective flow, because the bottom of the arc furnace itself is installed essentially horizontally.

The U.S. Pat. No. 4,870,655 relates to an electric arc furnace where the cooling of the furnace bottom is carried out by a cooling element which has the same shape as the furnace bottom and is mounted directly to the furnace bottom. This kind of a cooling element does not allow thermal expansion and is thus sensitive for possible disturbances caused by the thermal expansion.

U.S. Pat. Nos. 3,723,632 and 6,693,949 also describe cooling elements for arc furnaces which shapes are essentially the same as the furnace bottom and are mounted directly to the furnace bottom. Thermal expansion is also a problem for this shape of the cooling panel.

SUMMARY OF THE INVENTION

The object of the present invention is to eliminate drawbacks of the prior art and to achieve an improved arc furnace bottom construction, which achieves the maintenance of the outer surface temperature of the bottom construction essentially at least in the lower part of the arc furnace essentially close to the temperature surrounding the arc furnace. The essential features of the invention are enlisted in the appended claims.

According to the invention an arc furnace bottom construction contains at least two-part construction, which parts are installed separately to each other and seen from the side view in different heights, in the upper level and in the lower level. If the arc furnace bottom construction has more than two construction parts, which are installed in the side view in different heights, thus the parts of the bottom construction are installed in the upper level, in the middle level and in the lower level. Middle level planes as described can be one or more depending on the bottom construction. Using the two-part bottom construction the bottom construction is cooled by conducting a cooling medium to the space between the bottom construction parts installed on different heights, seen from the side view. By means of the cooling medium at least the outer surface temperature of the lower bottom construction part, seen from the side view, is adjusted essentially close to the temperature surrounding the arc furnace.

Because the arc furnace itself is a heavy construction, the arc furnace and the bottom construction shall be supported in the lower part at least one supporting construction external to the arc furnace. In the at least two-level bottom construction of the arc furnace it is utilized a supporting construction of the arc furnace which contains at least two-part supporting framework, a primary supporting framework and a secondary supporting framework. The supporting frameworks in the supporting construction of the arc furnace are installed, as seen from the side view, at different heights so that the primary supporting framework is installed on the lower level and the secondary supporting framework on the higher level.

According to the invention the lower part of the two-part bottom construction of the arc furnace is installed on the primary supporting framework freely to be moved in the side direction towards the primary supporting framework. The lower part of the bottom construction is attached mechanically to the jacket of the arc furnace advantageously by means of a flange joint. This kind of construction thus allows the heat expansion between the supporting framework and the lower part of the bottom construction.

The secondary supporting framework is installed inside the arc furnace between the lower part of the arc furnace bottom construction and the upper part of the bottom construction so, that the beams of the secondary supporting framework are separated from both the lower part of the bottom construction and the upper part of the bottom construction. The beams of the secondary supporting framework are attached to each other by mechanical binding devices, such as rod-like objects, so that the mutual distance between the beams in the sideward direction is maintained essentially the same, but at the same time the attachment allows the heat expansion in the longitudinal direction. Thus the beams of the secondary supporting framework are kept in their position in the sideward direction. Above the secondary supporting framework it is advantageous to make on the middle level of the bottom construction, seen from the side view, a construction part of separate plate-like parts, which separate parts are supported to the secondary supporting framework. The separate parts of the middle part are installed in a distance from each other because of the unequal heat expansion taken place in different points of the arc furnace bottom construction, in order that it is avoided possible construction damages in the arc furnace caused by the heat expansion. Between the lower part of the arc furnace bottom construction and the upper part of the bottom construction it is achieved an essentially horizontal space, which is to be cooled by means of a cooling medium conducted to the space. The space between the lower part of the arc furnace bottom construction and the upper part of the bottom construction is also possible to provide with at least one cooling element, wherein it is possible to conduct the cooling medium.

In order to make possible to conduct the cooling medium into the space between the lower part of the bottom construction and the upper part of the bottom construction and to remove the cooling medium from the space between the lower part of the bottom construction and the upper part of the bottom construction the jacket of the arc furnace is provided with at least one inlet for feeding the cooling medium and at least one outlet for removing the cooling medium from the space between the lower part of the bottom construction and the upper part of the bottom construction. In the bottom construction according to the invention there are inlets as much as outlets, but the number of inlets and outlets itself can vary according to the dimensions of the arc furnace. In order to focus the cooling medium between the side parts and the middle parts of the arc furnace at least the inlet of the cooling medium is provided with a distribution member of the cooling medium and advantageously also with an adjusting member, in which case the cooling medium is achieved in addition to the distribution quantitatively to focus advantageously between the different parts, the side parts and the middle parts, of the arc furnace bottom construction. When using at least one cooling element in the space between the lower part of the bottom construction and the upper part of the bottom construction the operating cooling medium in the cooling element is advantageously conducted through the cooling channels connected to the openings established in the jacket of the arc furnace.

BRIEF DESCRIPTION OF THE DRAWINGS

The invention is described in the following in more details referring to the enclosed drawings, wherein:

FIG. 1 shows one preferred embodiment schematically as a partial cross-section seen from the side view, and FIG. 2 shows another preferred embodiment schematically as a partial cross-section seen from the side view.

DESCRIPTION OF THE INVENTION

According to FIG. 1 an arc furnace 1 is supported in its lower side by a supporting framework 2, which is installed at least partly outside the arc furnace 1. The lower part 3 of the arc furnace 1 is in its lower side attached to the supporting framework 2 external to the arc furnace and by means of a binding member 4 to the furnace jacket 6 attached on the outer surface of the vertical wall of the arc furnace 1. Inside the arc furnace 1 above the lower part 3 of the bottom construction and below the upper part 7 of the arc furnace bottom construction it is established an intermediate space 8, wherein it is installed a secondary internal supporting framework 9 of the arc furnace 1.

According to the invention the cooling air operating as a cooling medium in cooling of the arc furnace bottom construction is conducted into the intermediate space 8 through a feeding inlet 10 established in the furnace jacket 6. The inlet 10 is provided with members 14 for the distribution of the cooling air and for adjusting the amount of the cooling air between the separate parts of the bottom construction. The cooling air is removed from the intermediate space 8 through an outlet 11 established into the arc furnace jacket 6.

According to the embodiment of the invention shown in FIG. 2 the cooling of a bottom construction of an arc furnace according to FIG. 1 is carried out by means of cooling elements 12 installed in the intermediate space 8 of the bottom construction. Then the cooling media is conducted from the outside of the arc furnace 1 to the cooling element 12 and away from the cooling element 12 through a connection channel 13 which at the end separated from the cooling elements 12 is connected on one hand to a source of a cooling medium positioned outside of the furnace jacket 6 of the arc furnace and in another hand to a removing station of a cooling medium positioned outside of the furnace jacket 6 of the arc furnace. As a cooling medium in the cooling elements 12 it is used gas, such as air, or liquid, such as water.

As one embodiment of the invention it can be used also the combination of the embodiments in FIGS. 1 and 2, where advantageously for instance through openings established in the furnace jacket 6 it is fed to the intermediate space 8 cooling air used as a cooling medium and into the cooling elements 12 installed in the intermediate space 8 it is conducted the same liquid cooling medium 12, such as water. It is also possible that both in the cooling elements 12 and in the intermediate space 8 it is used the same or similar cooling medium in different forms, either as gaseous form or liquid form.

The invention claimed is:

1. An arc furnace bottom construction for maintaining an outer surface temperature of the arc furnace bottom construction at least at a lower part of an arc furnace essentially close to a temperature surrounding the arc furnace, wherein the bottom construction comprises at least two separate constructions to be cooled, wherein the at least two separate constructions comprise at least an upper construction and a lower construction, the upper construction is positioned at a first height seen from a side view and the lower construction is positioned at a second height seen from the side view, the first height being different from the second height, and the lower construction is attached to an external jacket of the arc furnace and is movable with respect to a supporting framework of the arc furnace.

2. The arc furnace bottom construction according to claim 1, wherein the at least two separate constructions define an intermediate space, where a cooling medium is conducted.

3. The arc furnace bottom construction according to claim 2, wherein at least one cooling element is mounted in the intermediate space established between the at least two separate constructions where the cooling medium is conducted.

4. The arc furnace bottom construction according to claim 3, wherein the cooling medium to be conducted into the intermediate space and into the cooling element are of the same form.

5. The arc furnace bottom construction according to claim 3, wherein the cooling medium to be conducted into the intermediate space and into the cooling element are of a different form.

6. The arc furnace bottom construction according to claim 2, wherein the at least two separate constructions are separate plate-like parts as seen from the side view, and wherein the separate plate-like parts are installed at a distance from each other.

7. The arc furnace bottom construction according to claim 2, wherein, for conducting a cooling medium to the bottom construction, the external jacket of the arc furnace is provided with at least one inlet and at least one outlet.

8. The arc furnace bottom construction according to claim 1, wherein the at least two separate constructions are separate plate-like parts as seen from the side view, and wherein the separate plate-like parts are installed at a distance from each other.

9. The arc furnace bottom construction according to claim 8, wherein, for conducting a cooling medium to the bottom construction, the external jacket of the arc furnace is provided with at least one inlet and at least one outlet.

10. The arc furnace bottom construction according to claim 1, wherein, for conducting a cooling medium to the bottom construction, the external jacket of the arc furnace is provided with at least one inlet and at least one outlet.

11. The arc furnace bottom construction according to claim 10, wherein there are the same number of both inlets and outlets.

12. The arc furnace bottom construction according to claim 10, wherein the at least one inlet for the cooling medium is provided with members for distributing the cooling medium and for adjusting an amount of the cooling medium distributed between different parts of the bottom construction.

13. The arc furnace bottom construction according to claim 1, wherein the upper construction and the lower construction define an intermediate space, where a cooling medium is conducted, at least one inlet into the intermediate space is provided at a height seen from the side view that is between the first height and the second height and at least one outlet from the intermediate space is provided at a height seen from the side view that is between the first height and the second height.

* * * * *